June 8, 1965 JEAN-CLAUDE SIMON ET AL 3,188,640

RADIO LINK RELAYS

Filed Dec. 29, 1961 4 Sheets-Sheet 1

RADIO LINK RELAYS

Filed Dec. 29, 1961

June 8, 1965 JEAN-CLAUDE SIMON ETAL 3,188,640

RADIO LINK RELAYS

Filed Dec. 29, 1961 4 Sheets-Sheet 3

United States Patent Office 3,188,640
Patented June 8, 1965

3,188,640

RADIO LINK RELAYS

Jean-Claude Simon and Victor Biggi, Paris, France, assignors to C.S.F.-Compagnie Generale de Telegraphie Sans Fil, a corporation of France Filed Dec. 29, 1961, Ser. No. 163,184
Claims priority, application France, Jan. 6, 1961, 848,951
9 Claims. (Cl. 343—100)

The present invention relates to radio link relays and, more particularly, to relays adapted to be placed on board of artificial satellites.

It has already been suggested to use artificial satellites as relays for the transmission of radio or television programs or other signals. Owing to their high altitude, the satellites make a line-of-sight propagation of signals possible over distances covering at least a substantial fraction of the earth's circumference. A satellite may serve as a passive relay. In this case it sends back as echoes the signals received from the transmitter, towards a receiver station.

It may also serve as an active relay, by sending back amplified signals having, if desired, a frequency other than the original one.

In known systems of this type, it was necessary to keep an antenna constantly directed towards the earth, so that the satellite will always present the same face in the direction of the earth, during its rotation thereabout.

Moreover, the axis of rotation of the satellite had to be normal at any moment, to the plane of the orbit. This required the provision, aboard the satellite, of some kind of stabilizing system, of a generally complicated design.

It is an object of the present invention to avoid this necessity.

The relay device according to the invention comprises a plurality of directive antennas, for example of the endfire type, the radiation patterns of which taken together at a level 3 db below the maximum, cover the whole of the surrounding space, each of these antennas having a directivity pattern with an aperture angle at 3 dbs below the maximum at least equal to the solid angle under which the earth is seen from the satellite. Thus at any moment, and whatever the instantaneous relative position of the satellite, at least one antenna can receive radiations from the earth and may, simultaneously, transmit radiations towards the surface thereof.

The invention will be best understood from the following description and appended drawings, wherein:

FIG. 1 shows a spherically shaped artificial satellite 1, provided with a plurality of directive aerials 2 of the endfire type, having a similar radiation pattern with an aperture angle $\alpha$.

Each radiation pattern overlaps those adjacent thereto at level 3 dbs below the maximum, thus covering the whole of the surrounding space. In other words, the radiation patterns are uniformly distributed within the solid angle $4\pi$ of the space and the radiated beams cover completely this solid angle at a level 3 db below the maximum.

Figure 2:
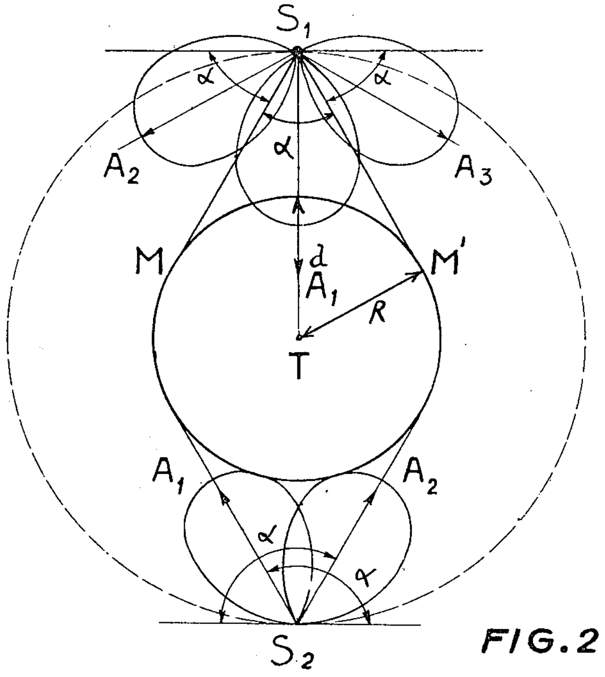
FIG. 2 is an explanatory diagram.

The antennas are both receiver and transmitter antennas. Angle $\alpha$ is selected to be equal to the angle within which the terrestrial globe T is seen from the satellite S, when the latter is placed on its orbit, as shown very diagrammatically in FIG. 2. It follows that, whatever the position of the satellite, at least one aerial is oriented in such a manner as to receive the signals sent out from a part of the terrestrial globe and reflect them back towards it. When the satellite is in position $S_1$, the radiation axis $S_1A_1$ of one of the aerials coincides with the straight line $S_1T$ connecting the satellite to the center of the globe. In the position $S_2$, the radiation axis $S_2A_1$ and $S_2A_2$ are tangent to the terrestrial globe and the direction, along which the two patterns concerned intersect, passes through the center of the globe.

The aperture angle of the radiation patterns and the number of the aerials to be provided are determined by the average altitude of the satellite. Assuming this altitude to be equal to 4000 km., M and M' being the intersection points of the satellite horizon with a same terrestrial meridian, and $\alpha$ the aperture of the radiation pattern, it appears that R being the radius of the terrestrial globe which is equal to 6000 km.

$$\sin\frac{\alpha}{2}=\frac{R}{R+4000}=0.6$$

and $$\cos\frac{\alpha}{2}=\sqrt{1-(0.6)^2}=\sqrt{0.64}=0.8$$

The solid angle $\Omega=MS_1M'$ is given by $$\Omega=2\pi\left(1-\cos\frac{\alpha}{2}\right)=2\pi.0.2$$

The number N of the aerials is accordingly:

$$N=\frac{4\pi}{\Omega}=\frac{4\pi}{2\pi 0.2}=10$$

It has been indicated that the respective beam patterns of two adjacent aerials intersect at a level of about 3 db below the maximum level. For endfire-type aerials, the maximum gain is that of an aerial having uniform radiation in the solid angle $\Omega$ and no radiation outside this angle. This maximum gain is thus obviously $$G=\frac{4\pi}{\Omega}=N=10$$

this gain being defined with respect to a source of isotropic radiation.

The maximum distance $d$ covered by an aerial is the are MM', where $d=R(\pi-\alpha)\cong 3600$ km.

It is advantageous to select aerials of the "endfire" type. It is necessary that the volume of these aerials should be as small as possible in order not to make it too difficult to have these aerials retracted within the satellite during the launching operation. It may also be desirable, should the satellite be operated as an active relay, that the aerials operate on two different types of polarizations, one for the reception and the other for the transmission, so as to ensure a decoupling between transmission and reception.

Several types of aerials satisfy some of these requirements.

Figure 3:
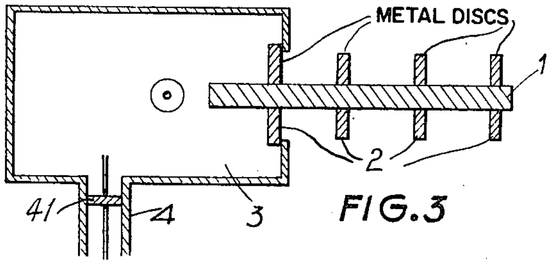
FIGS. 3, 4, 5 and 6 represent aerials of the endfire type which may be used in a system according to the invention.
Figure 4:
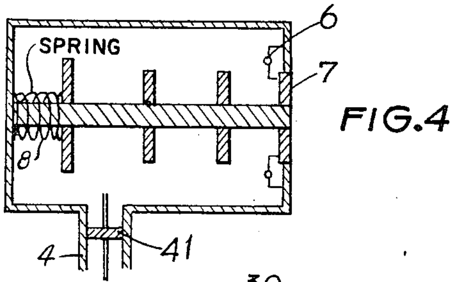

FIGS. 3 and 4 represent respectively a sectional view, after the launching operation, and during this operation, of a first embodiment given by way of example. The aerial is of the well known "cigar" type, comprising a metal rod 1 and four metal discs 2 carried by the rod. The antenna is excited by a cavity resonator 3 which resonates in mode $TE_{11}$ or any coaxial mode close thereto.

For a frequency of 2000 mcs., three discs of a diameter of 4.5 cm. and a 9 cm. long rod suffice to obtain a gain of 10 db. During the transmission, the cavity is excited by a coaxial cable 4, which makes possible the transmission with a first polarization, parallel to the axis of the coaxial cable. The waves received will have a polarization perpendicular to the previous one. A second coaxial cable, parallel to this second polarization, makes this reception possible. The device operates as a polarization duplexer.

FIG. 4 shows the aerial which is retracted within the cavity during the placing of the missile in orbit. A latch means 6, which is only diagrammatically shown, maintains disc 7 inside cavity 3. A spring 8 is compressed between the aerial and one wall of the cavity. At the instant the satellite is placed in orbit, any known means (not shown) can be used to cause device 6 to be withdrawn. For example, this means 6 may be controlled from the ground to be withdrawn or even destroyed after a predetermined duration by an explosive. Such devices are thoroughly conventional in the technique of ballistic missiles. The rod carrying the discs is then projected out of the cavity. Joints 41 are provided for maintaining a vacuum in the cavity after the launching of the missile.

Figure 5:
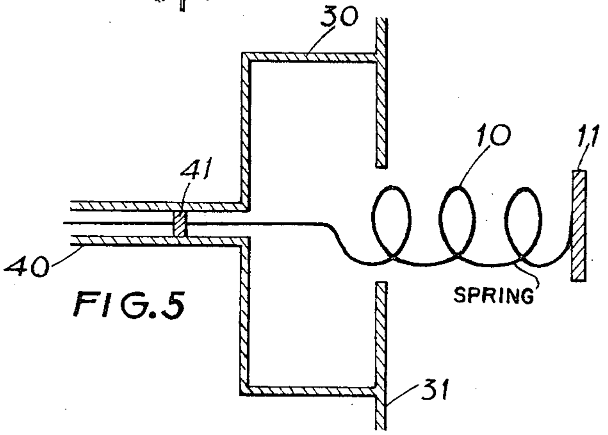
Figure 6:
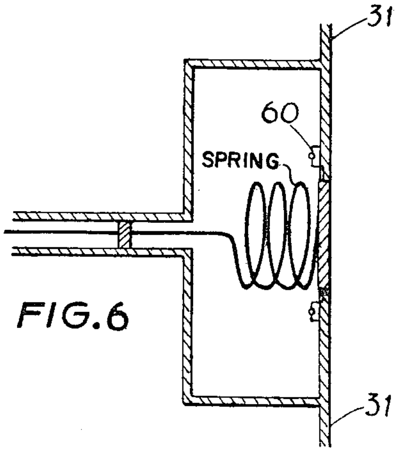

At lower frequencies, for example at 400 mc./s., an aerial shaped as a helix may be used, as shown in FIGS. 5 and 6.

A counterpoise 30 is built up by a reentrant portion of the body 31 of the satellite. Helix 10 has a length of the order of the wave length $\lambda$ and a diameter of the order of $\lambda/3$. It is excited by a coaxial cable 40, the outer conductor of which is welded to the counterpoise 30. A dielectric piece 11 is held within the counterpoise, during the placing in orbit of the satellite, by means of appropriate latch 60. Upon the satellite being placed on the orbit, these devices are spread apart and the helix is projected outside. The two positions are represented, respectively, in FIGS. 5 and 6. This aerial transmits and receives circular polarization waves, in the direction of the winding; it does not allow any decoupling of the transmitted and received waves.

In the case where an aerial has its axis directed towards the center of the terrestrial globe, this aerial is alone capable of receiving energy from a point of the earth such as M and reflecting the energy towards another point such as M'.

In any case, it will be noted that it is not necessary to excite all the aerials at the same time. The most favourable result is obtained when the following two conditions are satisfied:

(a) The waves transmitted by all the aerials transmitting at the same time are in phase, whatever the phase of the waves received from the transmitter.

(b) The intensity of the waves transmitted by each aerial is proportional to the intensity of the wave received by the same aerial. In particular, no energy will be transmitted by the aerials which do not receive any energy from the terrestrial transmitter.

In order that these conditions should be satisfied, two general methods may be followed in the case of active relays.

Figure 7:
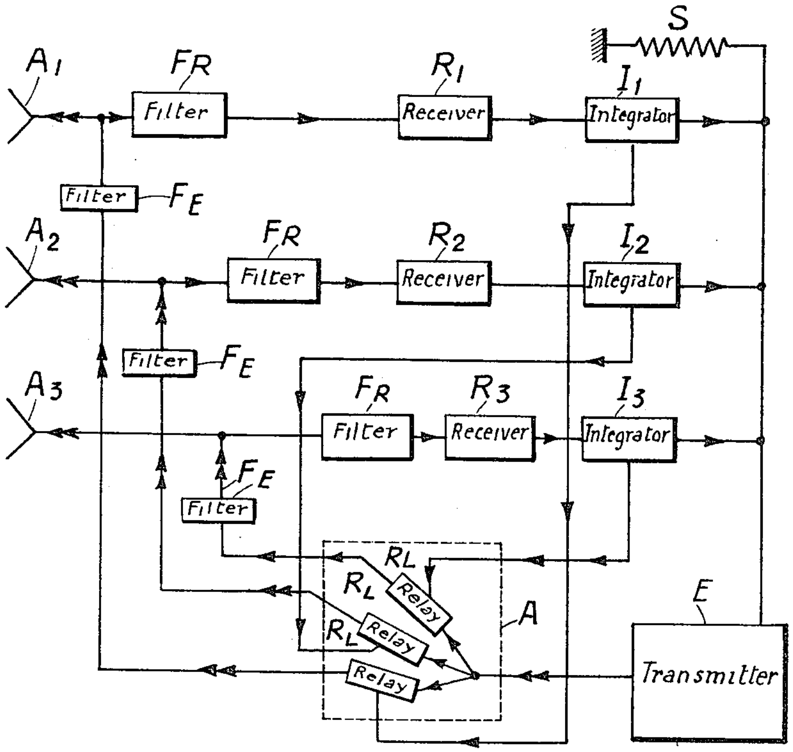
FIGS. 7 and 8 show block diagrams of embodiments of portions of the system according to the invention.

FIG. 7 is a block diagram of an embodiment, where the switching is effected at a high frequency level.

This figure shows *n* receivers $R_1$, $R_2$, $R_3$ (*n* being equal to three, in the example illustrated), which are coupled to *n* aerials $A_1$, $A_2$, $A_3$, respectively, through pass-band filters $F_R$, which allow the passage of a frequency band corresponding to the signal transmitted from the earth. These receivers are coupled to a common load S. The video signal thus collected is used to modulate a transmitter E connected to the three aerials, through three filters $F_E$, which allow the passage of the transmission band, and by means of a mechanical switching channel. The latter comprises three relays $R_L$ respectively controlled by three integrator devices $I_1$, $I_2$, $I_3$ located, respectively, between receivers $R_1$, $R_2$, $R_3$ and load S. These integrators extract the D.C. component of the video current at the output of each receiver. When this D.C. component has a sufficiently high level, they actuate the corresponding relay $R_L$. The transmitter thus transmits on the aerial or aerials which receive signals from the earth. These relays may, for example, operate a mechanical control which couples a microstrip line coupled to the aerial, such a system operating only when the signal-to-noise ratio is high.

Figure 8:
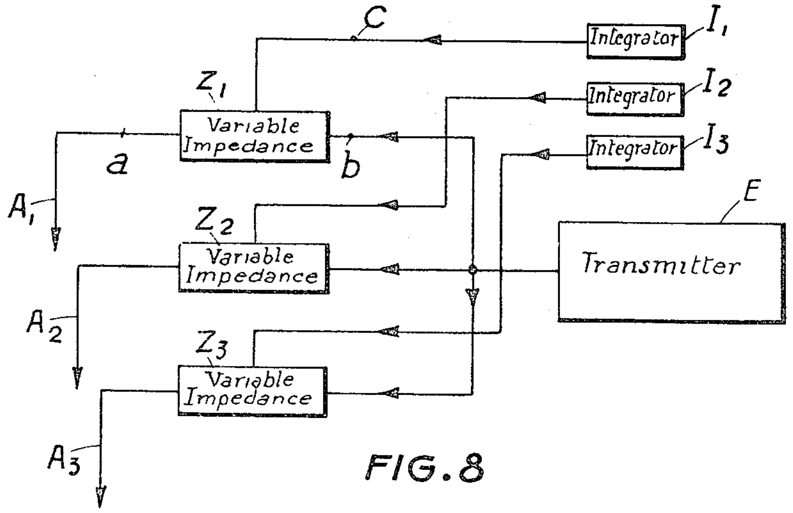

FIG. 8 is a block diagram of an electronic switcher. Integrators $I_1$, $I_2$ and $I_3$ act on three variable impedances $Z_1$, $Z_2$ and $Z_3$, respectively, located between the transmitter E and the three aerials $A_1$, $A_2$ and $A_3$. These impedances have a value which is smaller as the corresponding output current of the integrators $I_1$, $I_2$ and $I_3$ is higher.

Figure 9:
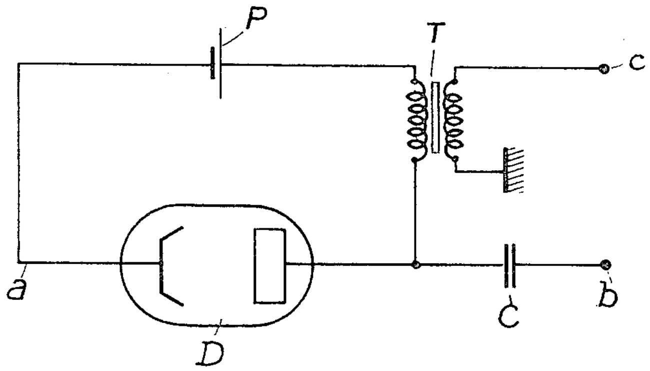
FIG. 9 shows a detail.

One such impedance $Z_1$ is shown in FIG. 9, where a diode D is connected between the points *a* and *b* of FIG. 8. The cathode of diode D is connected directly to *a* and the anode is connected to *b* through a decoupling capacitor C. Between the anode and the cathode, are connected a D.C. voltage source P and the secondary winding of a transformer T, the primary winding of which is connected between the point *c* of FIG. 8 and ground. The operation of the device is obvious. This arrangement is easily achieved for frequencies of the order of 400 mc./s.

For frequencies higher than 2000 mc./s., the diode may be substituted by a semi-conductor diode such as those used in parametric amplifiers. It is then desirable to locate the diode within a band filter so as to increase the impedance variation as a function of the integrator current.

In all the cases, the transmitter E excites the aerials in phase. It is easy to check that the energy radiated by each aerial is proportional to that which it receives.

Figure 10:
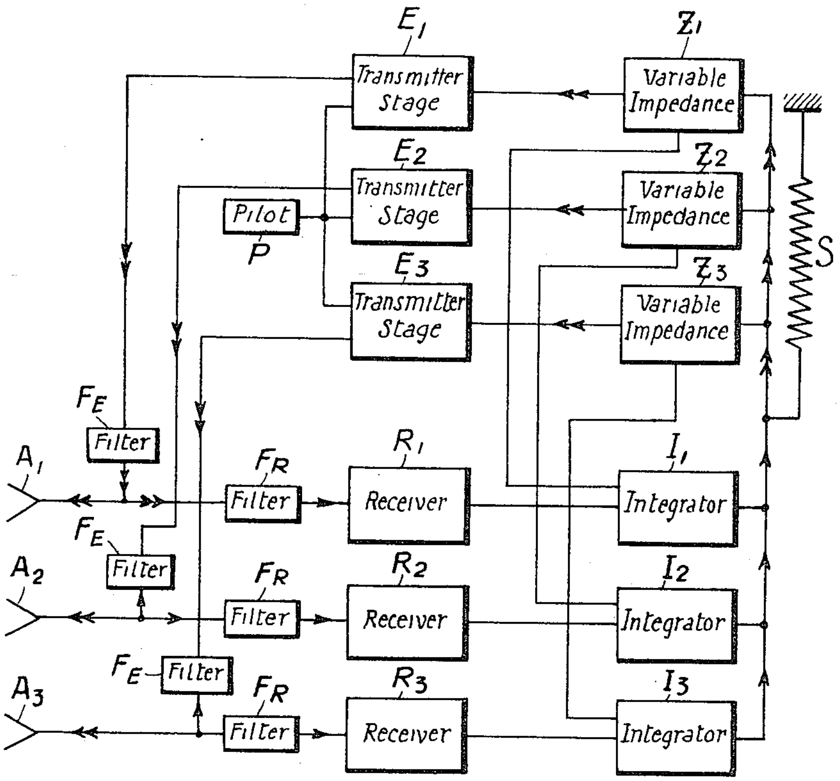
FIG. 10 shows another block diagram of a system according to the invention.

FIG. 10 is a block diagram of one embodiment given by way of example, wherein the switching is effected on the video current from load S. In this case *n* high frequency transmitter stages ($n=3$ in FIG. 10) $E_1$, $E_2$ and $E_3$ are put in phase by a common pilot or master oscillator P. Variable impedances $Z_1$, $Z_2$, $Z_3$ whose magnitude is controlled respectively by integrators $I_1$, $I_2$, $I_3$ are inserted between transmitters $E_1$, $E_2$, $E_3$ and the load S. They cause both the transmitted high frequency field and the modulation current to be varied. In all cases, the electric lengths of the high frequency lines must be such that the fields respectively transmitted by the aerials are in phase.

Figure 1:
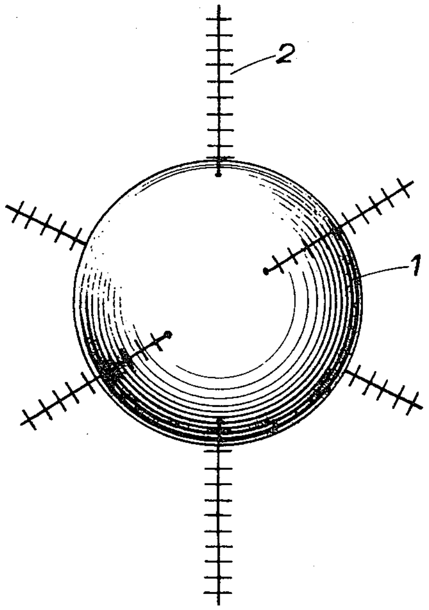
FIG. 1 is a perspective view of a satellite equipped according to the invention.

When the satellite is used as a passive relay, the energy sent by the satellite towards the earth is the energy reflected by each aerial. Each aerial in FIG. 1 must end in an ultra-high frequency short-circuit, for example, a metallization deposited over the body 1 of the satellite.

Thus, the invention makes the use of any stabilizing means unnecessary and this largely compensates for the fact that the electronic equipment is made somewhat more complicated.

What is claimed is:

1. A radio link relay, adapted to be placed on an artificial satellite comprising: a support; a plurality of simultaneously receiving and transmitting aerials equally spaced from each other and carried by said support; said aerials having respective directive radiation patterns, the respective patterns of adjacent aerials overlapping each other, substantially at 3 db's, the aperture angle at 3 db's of said patterns, being substantially equal to the solid angle within which the terrestrial globe is seen from the satellite.

2. A radio link relay, adapted to be placed on an artificial satellite comprising a support; a plurality of simultaneously receiving and transmitting end fire aerials equally spaced from each other and carried by said support and having respective directive radiation patterns, identical to each other, the respective patterns of adjacent aerials overlapping to each other, substantially at 3 db's, the aperture angle at 3 db's of said patterns, being substantially equal to the solid angle within which the terrestrial globe is seen from the satellite; and means for projecting said aerials outside said support.

3. A radio link relay, adapted to be placed on an artificial satellite comprising a support; a plurality of simultaneously receiving and transmitting end fire aerials equally spaced from each other and carried by said support and having respective directive radiation patterns, identical to each other, the respective patterns of adjacent aerials overlapping each other, substantially at 3 db's, the aperture angle at three db's of said patterns, being substantially equal to the solid angle within which the terrestrial globe is seen from the satellite; means for projecting said aerials, outside said support, each aerial comprising a cavity resonator of cylindrical form, two coaxial lines in perpendicular relationship with respect to each other coupled to said cavity resonator, a cigar type antenna coaxial with said cavity resonator, and perpendicular to both said coaxial lines.

4. A radio link relay, adapted to be placed on an artificial satellite comprising a support; a plurality of simultaneously receiving and transmitting end fire aerials equally spaced from each other and carried by said support and having respective directive radiation patterns, identical to each other, the respective patterns of adjacent aerials overlapping each other, substantially at 3 db's, the aperture angle at three db's of said patterns, being substantially equal to the solid angle within which the terrestrial globe is seen from the satellite; means for projecting said aerials outside said support, each aerial comprising: a counterpoise, a coaxial line having an outer conductor coupled to said counterpoise, an inner conductor, and a helically shaped line coupled to said inner conductor.

5. A passive radio link relay, adapted to be placed on an artificial satellite comprising a support: a plurality of simultaneously receiving and transmitting aerials equally spaced from each other and carried by said support; said aerials having respective directive radiation patterns, identical to each other, the respective patterns of adjacent aerials overlapping each other, substantially at 3 db's, the aperture angle at three db's of said patterns, being substantially equal to the mean solid angle within which the terrestrial globe is seen from the satellite, and a short circuit means in each aerial near said support.

6. A radio link relay, adapted to be placed on an artificial satellite comprising a support; a plurality of simultaneously receiving and transmitting end fire aerials equally spaced from each other and carried by said support and having respective directive radiation patterns, identical to each other, the respective patterns of adjacent aerials overlapping each other, substantially at 3 db's, the aperture angle at three db's of said patterns, being substantially equal to the solid angle within which the terrestrial globe is seen from the satellite; means for projecting said aerials, outside said support, a first plurality of band pass filters, a plurality of receivers and a plurality of integrators respectively connected in series to said plurality of aerials; a common load connected between said integrators and ground; at least one transmitter having an output; a second plurality of second band pass filters connected in series between said transmitter output and said aerials for feeding in phase said aerials; a switching device having an input coupled to said output, means for connecting said input to said load, and a plurality of outputs, means controlled by said integrators for connecting respectively said outputs to said plurality of second bandpass filters.

7. A radio link relay, adapted to be placed on an artificial satellite comprising a support; a plurality of simultaneously receiving and transmitting end fire aerials equally spaced from each other and carried by said support and having respective directive radiation patterns, identical to each other, the respective patterns of adjacent aerials overlapping each other, substantially at 3 db's, the aperture angle at three db's of said patterns, being substantially equal to the solid angle within which the terrestrial globe is seen from the satellite; means for projecting said aerials, outside said support; a first plurality of band pass filters, a plurality of receivers and a plurality of integrators respectively connected in series to said plurality of aerials; a common resistive load connected between said plurality of integrators and ground, a transmitter having an input connected to said load and an output; a switching device having one input connected to said output of said transmitter, and a plurality of outputs; a second plurality of band pass filter series respectively connected between said plurality of outputs and said aerials for feeding in phase said aerials from said transmitter; and, means controlled by said integrators, for controlling said switching device.

8. A radio link relay, adapted to be placed on an artificial satellite comprising a support; a plurality of simultaneously receiving and transmitting end fire aerials equally spaced from each other and carried by said support and having respective directive radiation patterns, identical to each other, the respective patterns of adjacent aerials overlapping each other, substantially at 3 db's, the aperture angle at three db's of said patterns, being substantially equal to the solid angle within which the terrestrial globe is seen from the satellite; means for projecting said aerials, outside said support; first plurality of band pass filters, a plurality of receivers and a plurality of integrators respectively connected in series to said plurality of aerials; a common resistive load connected between said plurality of integrators and ground, a transmitter having an input connected to said common load and a plurality of ouputs: a plurality of variable impedances; a second plurality of band pass filters connected in series respectively, between said outputs and said plurality of aerials, for feeding in phase said aerials; means controlled by said integrators for controlling said variable impedances.

9. A radio link relay, adapted to be placed on an artificial satellite comprising a support; a plurality of simultaneously receiving and transmitting end fire aerials equally spaced from each other and carried by said support and having respective directive radiation patterns, identical to each other, the respective patterns of adjacent aerials overlapping each other, substantially at 3 db's, the aperture angle at three db's of said patterns, being substantially equal to the solid angle within which the terrestrial globe is seen from the satellite; means for projecting said aerials, outside said support; a first plurality of band pass filters, a plurality of receivers and a plurality of integrators respectively connected in series to said plurality of aerials; a common resistive load connected between said plurality of integrators and ground, a plurality of transmitter stages having respective inputs for feeding in phase said aerials; a common pilot for controlling said stages; a plurality of variable impedances respectively connecting said stages to said load; means controlled by said integrators, for controlling said variable impedances.

References Cited by the Examiner

UNITED STATES PATENTS

| | | | |
|---|---|---|---|
| 2,663,797 | 12/53 | Kock | 333—95 |
| 2,921,277 | 1/60 | Goubau | 333—95 |
| 3,095,538 | 6/63 | Silberstein | 343—100 |
| 3,098,229 | 7/63 | Raabe | 343—915 |

CHESTER L. JUSTUS, *Primary Examiner.*